Nov. 11, 1924.

W. C. ANTHONY

ELEVATING SHOVEL

Filed Nov. 15, 1923

1,514,818

Inventor
William C. Anthony
by Parker & Carter
Attorneys.

Patented Nov. 11, 1924.

1,514,818

UNITED STATES PATENT OFFICE.

WILLIAM C. ANTHONY, OF STREATOR, ILLINOIS, ASSIGNOR TO ANTHONY COMPANY, OF STREATOR, ILLINOIS, A CORPORATION OF ILLINOIS.

ELEVATING SHOVEL.

Application filed November 15, 1923. Serial No. 674,825.

*To all whom it may concern:*

Be it known that I, WILLIAM C. ANTHONY, a citizen of the United States, residing at Streator, in the county of La Salle and State of Illinois, have invented a certain new and useful Improvement in Elevating Shovels, of which the following is a specification.

This invention relates to an elevating shovel, and particularly to a structure of that type which is adapted to be mounted on a self-propelled vehicle, preferably a tractor. As illustrated herewith it is so mounted. One object of the invention is to provide in such a shovel a self-contained assembly which may take and raise material, and may be also used to transport the same, and may in short be used for any purpose to which a digging and elevating shovel is adapted. Another object is to provide in such a shovel means whereby the shovel will obtain a complete dump and will at all times when released, automatically return from the dumping position. Another object is to provide in such a shovel means whereby the shovel may in the digging position have its bottom inclined downwardly and forwardly, and in the raising and transporting position have its bottom moved from this inclination so as to retain the load more readily. Other objects will appear from time to time in the specification and claims.

My invention is illustrated more or less diagrammatically in the accompanying drawings, wherein—

Like parts are designated by like characters throughout.

Figures 1, 2:
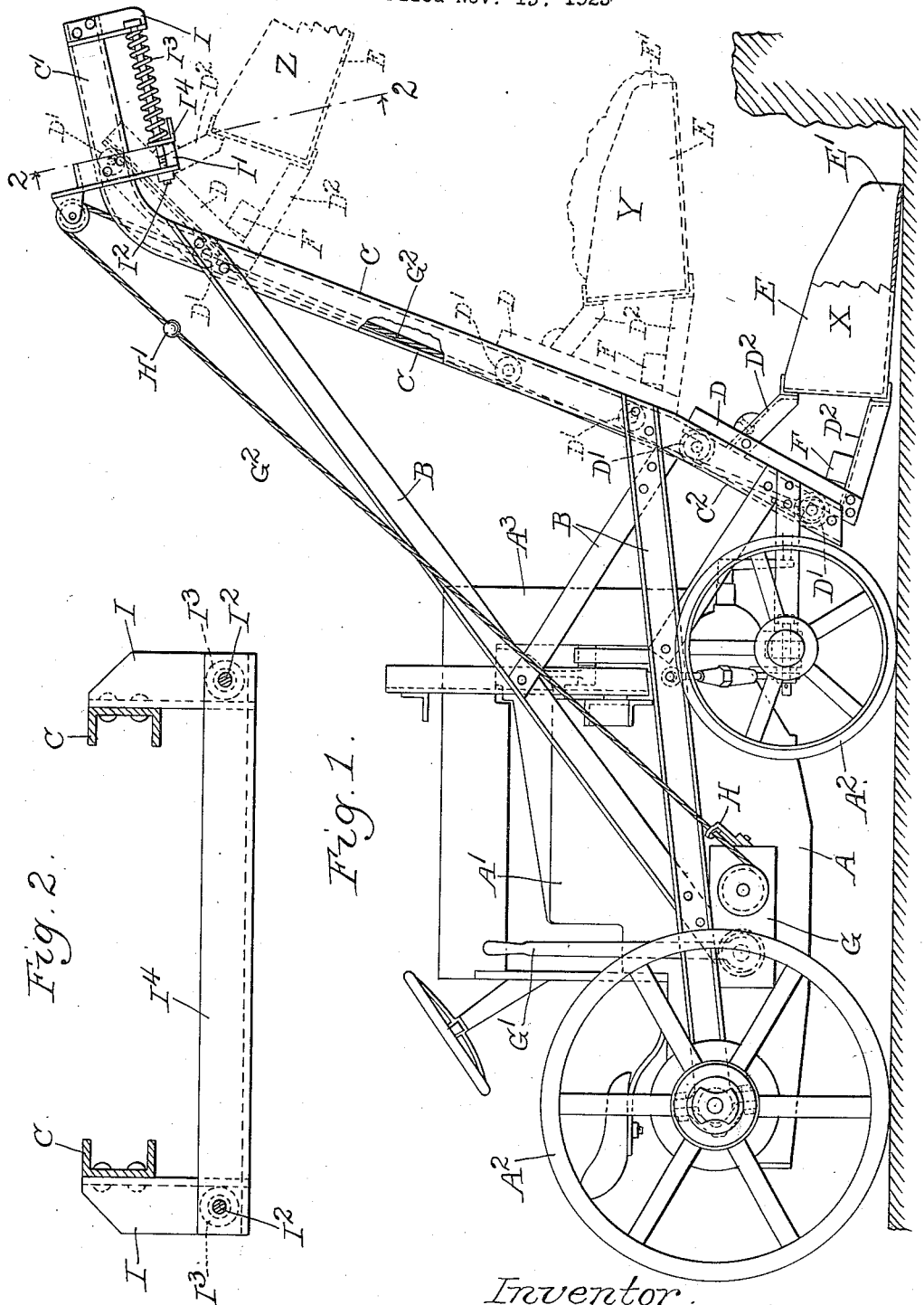
Figure 1 is a side elevation with parts in section.
Figure 2 is a cross section on an enlarged scale taken at line 2—2 of Figure 1.

A is a tractor provided with an engine $A^1$, wheels $A^2$ and the radiator $A^3$. The tractor forms no part of the present invention and will not be described in detail.

Mounted upon the tractor is a track supporting frame work B. This frame work may be of any suitable proportion and arrangement. Its details are not here described as it forms no part of the present invention. It is sufficient that it be strong and rigid and secured to the tractor so as to carry the other parts of the shovel assembly.

Secured to the forward part of the frame B is a pair of channel track members C. At their upper ends they are forwardly bent to provide a forwardly extending portion $C^1$, and at their lower ends they are slightly rearwardly bent to provide a rearwardly bent portion $C^2$ on each.

D is a small truck provided with pairs of wheels $D^1$ $D^1$ and adapted by means of said wheels to run in the channels of the track C. Extending forwardly from the truck D is a plurality of arms $D^2$ $D^2$ and these arms carry the shovel E. The shovel is provided with a generally plain bottom with sides and rear and an open front $E^1$ adapted to be forced into the material which is to be taken into the shovel.

F is a weight which may be placed upon the truck to assist in causing the shovel and track automatically to return from the raised dumping position after the load has been discharged.

Extending out from the side of the tractor and driven by its engine is a winch mechanism G, provided with a control lever $G^1$. Adapted to be operated by the winch is a hoisting cable $G^2$ secured at its upper end in a suitable portion of the truck D. By the rotation of the winch, the cable is drawn in or allowed to run out, and thus the shovel is raised and lowered. The winch is preferably provided with an automatic stopping trigger or lever H. Upon the cable is a stop $H^1$. When the shovel has been raised to the full upper position, the stop $H^1$ will contact the trigger or lever H and will operate it automatically to shut off the driving mechanism and to prevent further raising of the shovel.

At the top of the track assembly and mounted at one end in the downwardly extending arms I, $I^1$ which are attached to the track members C, is a pair of rods $I^2$. About each of these rods is a coiled helical spring $I^3$. Adjacent the members $I^1$ and perforated so as to slide upon the rods $I^2$ is an angle $I^4$. As the shovel moves toward the upper position and approaches its upper limit, a portion of the shovel assembly, in this case the upper arms $D^2$ strikes the angle $I^4$ and as the raising movement continues forces it outward and upward compressing the spring $I^3$. When the load has been discharged and the shovel is free to return to the lowered position, the springs which are now under compression tend to force the shovel downward from the extreme dumping position and so it acts to return to the shoveling position.

Although I have shown an operative device, still it will be obvious that many changes might be made in size, shape and arrangement of parts without departing materially from the spirit of my invention; and I wish therefore that my showing be taken as in a sense diagrammatic.

The use and operation of my invention are as follows:

When it is desired to raise material, the shovel will be lowered to the position indicated at X in full lines in Figure 1. In this position the tractor will be driven against the material, the shovel will be forced into the material and will be loaded. As indicated and as above described, in this position the floor of the shovel is inclined forwardly and downwardly. This position is advantageous to the shoveling movement, but causes some loss of material as the shovel is raised. In order to prevent this, the track is rearwardly bent toward its bottom. As the upward movement of the shovel is commenced, it moves from this rearwardly bent portion to the position shown in dotted lines at Y, and the angle of inclination of the floor of the shovel is either greatly reduced or, if the parts be so proportioned, is reversed so that the floor of the shovel is rearwardly and downwardly inclined and the load is thus retained readily in the shovel. As the shovel approaches the upper end of the track, as shown in dotted lines at Z in Figure 1, it moves about the curved portion and so tips and dumps its load.

In order to have a sufficiently complete angle of inclination and to insure a positive dump, at all times, of the material within the shovel, it has been found necessary to bend the upper end of the track very sharply to the front. In this position, when the shovel is empty it is sometimes very sluggish in its return movement since the track is bent approximately about the arc of a circle which has as its center, the center of gravity of the shovel. In order to insure rapid and automatic return I may use a counterweight which is preferably placed on the truck, and thus the shovel will return. Or I may use the compression spring arrangement above described. Either of these means may be adapted or both may be used together. By means of them I secure rapid and automatic return of the shovel.

I claim:

1. In a shoveling apparatus a tractor and an engine therefor, a shovel-supporting framework mounted upon said tractor and a track thereon and a shovel movable along said track and means for raising and lowering it, said track comprising a plurality of sections of varying inclination to the horizontal, the angular relation between the shovel bottom and the lower portion of said track being such that when it is in position thereupon the forward edge of the shovel is positioned in a plane lower than the rest of the shovel bottom, the angular relation of the shovel and the portion of the track lying above said lower portion being such that when it is positioned thereupon, the forward edge of the shovel lies in a plane above the rest of the shovel bottom.

2. In a shoveling apparatus a tractor and an engine therefor, a shovel-supporting framework mounted upon said tractor and a track thereon and a shovel movable along said track and means for raising and lowering it, said track comprising a plurality of sections of varying inclination to the horizontal, the angular relation of the shovel to said track being such that when the shovel is positioned upon the lower of said sections its bottom is tilted downwardly and outwardly with its outer edge lying in a plane below the rest of the bucket, and when the shovel is positioned upon the section above said lower section its bottom is tilted downwardly and inwardly, with its outer edge lying in a plane above the rest of the bucket.

3. In a shoveling apparatus a tractor and an engine therefor, a shovel-supporting framework mounted upon said tractor and a track thereon and a shovel movable along said track and means for raising and lowering it, said track comprising a plurality of straight sections inclined to each other, the angular relation of the shovel to said track being such that when it is positioned upon the lower of said sections its bottom is tilted downwardly and outwardly with its outer edge lying in a plane below the rest of the bucket, and that when it is positioned upon an upper section its bottom is tilted inwardly, with its outer edge lying in a plane above the rest of the bucket bottom.

4. In an elevating shovel a track and a shovel adapted to rise and fall therealong, the upper end of said track being laterally bent, the shovel adapted to move on said laterally bent portion, and means in addition to the weight of the shovel for initiating its downward return movement.

5. In an elevating shovel a track and a shovel adapted to rise and fall therealong, the upper end of said track being laterally bent, the shovel adapted to move on said laterally bent portion, and means in addition to the weight of the shovel for initiating its downward return movement, said means including a counterweight mounted on a part of the moving shovel.

6. In an elevating shovel, a track and a shovel adapted to rise and fall therealong, the upper end of said track being laterally bent, the shovel adapted to move on said laterally bent portion, and means in addition to the weight of the shovel for initiating its downward return movement, said means including a spring device located adjacent the upper end of the track and adapted to be contacted and compressed by the shovel as it approaches the upper limit of its excursion.

7. In an elevating shovel a track and a shovel adapted to rise and fall therealong, the upper end of said track being laterally bent, the shovel adapted to move on said laterally bent portion, and means in addition to the weight of the shovel for initiating its downward return movement, said means including a counterweight mounted on a part of the moving shovel and a spring device located adjacent the upper end of the track and adapted to be contacted and compressed by the shovel as it approaches the upper limit of its excursion.

8. In a shovel, a track and a shovel adapted to move therealong, said track so shaped adjacent its lower end that the bucket is bodily rotated so that the forward side of the shovel is lowered as it approaches the bottom of the track, said track being laterally bent at its upper end, said shovel adapted to move on said laterally bent portion and means other than the weight of said shovel for initiating its return downward movement.

9. In a shovel, a track and a shovel adapted to move therealong, said track so shaped adjacent its lower end that the bucket is bodily rotated so that the forward side of the shovel is lowered as it approaches the bottom of the track, said track being laterally bent at its upper end, said shovel adapted to move on said laterally bent portion and means other than the weight of said shovel for initiating its return downward movement, said means including a counterweight mounted on a part of the moving shovel.

10. In a shovel, a track and a shovel adapted to move therealong, said track so shaped adjacent its lower end that the forward side of the shovel is lowered as it approaches the bottom of the track, said track being laterally bent at its upper end, said shovel adapted to move on said laterally bent portion and means other than the weight of said shovel for initiating its return downward movement, said means including a spring device located adjacent the upper end of the track and adapted to be contacted and compressed by the shovel as it approaches the upper limit of its excursion.

11. In a shovel, a track and a shovel adapted to move therealong, said track so shaped adjacent its lower end that the forward side of the shovel is lowered as it approaches the bottom of the track, said track being laterally bent at its upper end, said shovel adapted to move on said laterally bent portion and means other than the weight of said shovel for initiating its return downward movement, said means including a counterweight mounted on a part of the moving shovel and a spring device located adjacent the upper end of the track and adapted to be contacted and compressed by the shovel as it approaches the upper limit of its excursion.

12. In combination in an elevating shovel an automotive vehicle and a rigid track removably carried thereby, a bucket adapted to run along said track and means for raising and lowering the bucket therealong, said track so shaped that the angle of inclination of the bucket at the bottom of the track is greater than the angle it occupies throughout the major portion of the track, there being spring means associated with the upper end of the track adapted to be contacted by the bucket as it approaches its upper limit and adapted to assist in initiating the return movement of the bucket when it is free to return.

13. In a self-propelled elevating shovel an automotive vehicle and a shovel track rigidly carried thereon, said track including a pair of parallel track members supported in a generally upright position and inclined forwardly, the lower portion of the track being rearwardly bent with relation to the major part of the track, there being a bucket adapted to be moved upward along said track and means for moving the same, said bucket carried by a frame, said frame provided adjacent its base with a counterweight, there being adjacent the upward end of the track a spring mechanism which is compressed by the bucket in its upward movement and which assists in initiating the return movement of the bucket when it is free to return.

14. An elevating shovel including a fixed inclined track element forwardly bent at its upper end and a shovel adapted to be raised and lowered along said track element, means for initiating its return movement from such forwardly bent portion, said means including a counterweight on the shovel and a spring element on the track adapted to be compressed by the shovel as it approaches its upper limit.

15. An elevating shovel comprising in combination an automotive vehicle, a track supporting element rigidly fastened thereon, and a pair of parallel track elements carried by said frame, a truck adapted to run in said track and carrying a shovel, means for raising the forward side of said shovel as it rises along the track from its lower position to a higher position, said means comprising a rearwardly bent lower portion of said track element, and positioned at the upper end of said track a spring device adapted to be contacted by said truck as it approaches its upper limit and to be compressed by the upward movement of said truck and to assist in initiating the reverse movement of said truck when it is free to descend.

16. In a tractor, an engine assembly including a transmission, said engine assembly forming the framework of said tractor, in combination with a shovel assemble mounted on said tractor, and including a shovel supporting framework substantially surrounding said engine and having a shovel movable therealong, driving means for said shovel mounted on said engine and secured thereto independent of said shovel supporting framework.

17. In a tractor, an engine and a shovel assembly mounted on said tractor and including a shovel supporting framework substantially surrounding said tractor and a shovel movable therealong, and driving means for said shovel mounted on said tractor and secured thereto independently of said shovel supporting framework at a point spaced away from the points of attachment of said supporting framework to said tractor, and structurally separate therefrom.

18. In a shoveling apparatus, a wheeled vehicle, an axle upon which some of said wheels are mounted, a supporting structure mounted on said vehicle at the forward end thereof, and a shovel adapted to be moved along said structure, said vehicle adapted to be driven forward to fill said shovel, and means for transmitting the thrust incident to filling said shovel directly to said vehicle frame, comprising in part a longitudinal structural element connected at its forward end to the supporting structure and at its rear to an axle of the vehicle.

19. In a shoveling apparatus, a wheeled vehicle, an axle upon which some of said wheels are mounted, a supporting structure mounted on said vehicle at the forward end thereof, and a shovel adapted to be moved along said structure, said vehicle adapted to be driven forward to fill said shovel, and means for transmitting the thrust incident to filling said shovel to said vehicle frame, comprising in part a longitudinal structural element connected at its forward end to the supporting structure and at its rear to the rear axle of the vehicle.

20. In a shoveling apparatus, a wheeled vehicle, an axle upon which some of said wheels are mounted, a supporting structure mounted on said vehicle at the forward end thereof, and a shovel adapted to be moved along said structure, said vehicle adapted to be driven forward to fill said shovel, and means for transmitting the thrust incident to filling said shovel directly to the rear axle of the vehicle.

Signed at Streator county of La Salle and State of Illinois, this 2nd day of November 1923.

WILLIAM C. ANTHONY.